United States Patent [19]

Shedigian

[11] Patent Number: 4,679,119
[45] Date of Patent: Jul. 7, 1987

[54] DIELECTRIC FLUID FOR ELECTRICAL CAPACITORS

[75] Inventor: Vandos Shedigian, Indianapolis, Ind.

[73] Assignee: Emhart Industries, Inc., Indianapolis, Ind.

[21] Appl. No.: 873,975

[22] Filed: Jun. 13, 1986

[51] Int. Cl.⁴ ............................................. H01G 4/22
[52] U.S. Cl. .................................... 361/315; 361/319;
361/327; 174/17 LF; 174/23 C; 174/25 C;
252/570; 252/579
[58] Field of Search ............... 252/570, 579; 361/315,
361/319, 327; 174/17 LF, 23 C, 25 C

[56] References Cited

U.S. PATENT DOCUMENTS

| | | | |
|---|---|---|---|
| 3,855,508 | 12/1974 | Ress et al. | 252/579 |
| 3,925,221 | 12/1975 | Eustance | 252/579 |
| 3,948,787 | 4/1976 | Manek | 252/579 |
| 4,190,682 | 2/1980 | Shaw | 252/579 |
| 4,420,791 | 12/1983 | Shedigian | 252/570 |
| 4,482,478 | 11/1984 | Shaw | 252/570 |
| 4,538,206 | 8/1985 | Shedigian | 252/579 |

Primary Examiner—Josephine L. Barr
Attorney, Agent, or Firm—Robert E. Meyer; Carl A. Forest

[57] ABSTRACT

Di octyl phthalate (DOP) is used as a dielectric fluid for a-c electrical capcitors. An additive of an epoxidized linseed oil in an amount from 0.1% to 30% by weight of DOP stabilizes the capacitors and thus prolongs their life.

2 Claims, 3 Drawing Figures

DIELECTRIC FLUID FOR ELECTRICAL CAPACITORS

BACKGROUND OF THE INVENTION

This invention relates to a dielectric liquid impregnant for electrical devices and more parrticularly to an electrical capacitor utilizing an improved dielectric liquid impregnant.

Liquid impregnants for electrical capacitors should have a high dielectric constant, maintain a low dissipation factor, and be compatible with other materials utilized in the capacitor structure. At the same time, the impregnant must withstand elevated and fluctuating temperature, pressure, and voltage stress conditions with excellent electrical characteristics for a long operative life of the capacitor.

The polychlorinated biphenyls as capacitor impregnants meet these requirements and they were eminently satisfactory for several decades. The polychlorinated biphenyls are broadly referred to as PCBs. The polychlorinated biphenyls have recently been associated with ecological problems, restrictive use limitations, and rising costs. These problems have spurred the search for a suitable replacement capacitor impregnant which would have some advantageous impregnant characteristics comparable to those of the chlorinated diphenyls, and still provide outstanding electrical and compatibility performance with the two most important present day capacitor solid dielectrics, paper and polypropylene. As a result, di octyl phthalate (DOP) has been used as providing good electrical characteristics as a dielectric fluid impregnant.

FEATURES OR OBJECTS OF THE INVENTION

It is a feature of the invention to increase the stability of DOP as used in a capacitor so as to increase the capacitor life. Another feature of the invention is to provide a capacitor having a dielectric fluid of DOP with an additive of epoxidized linseed oil. These and other features of the invention will become apparent from the following description taken in conjunction with the accompanying drawings.

SUMMARY OF THE INVENTION

Generally speaking, the present invention pertains to a capacitor having a dielectric fluid which includes DOP and an additive of epoxidized linseed oil.

DISCUSSION OF THE INVENTION

Figure 1:
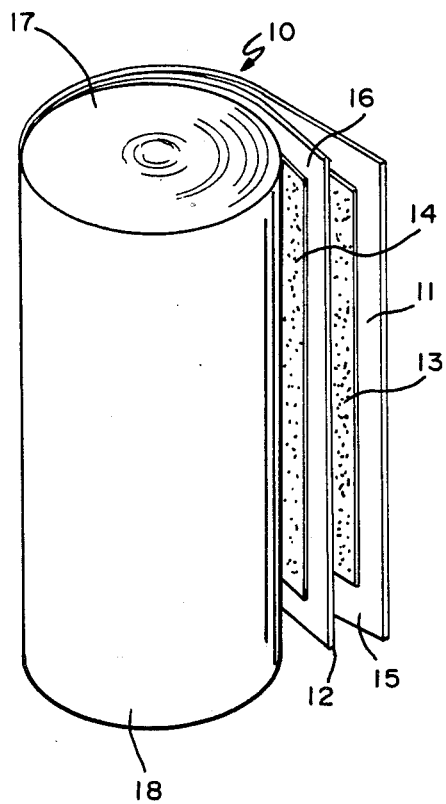
FIG. 1 of the drawing illustrates a convolutely wound a-c capacitor body partially unwound to show the dielectric plastic film and foil electrode structure.
Figure 2:
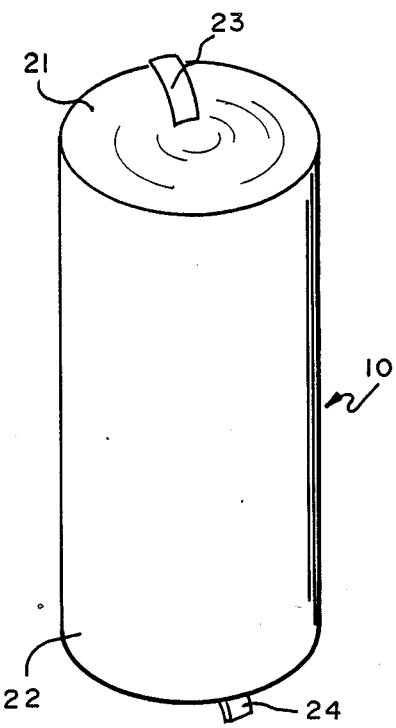
FIG. 2 of the drawing illustrates the convolutely wound a-c capacitor body of FIG. 1 to which leads are attached.

Referring now to FIG. 1 of the drawing, there is illustrated a convolutely wound a-c capacitor body 10. The capacitor body 10 includes a pair of dielectric film layers 11 and 12 and overlying electrodes 13 and 14, respectively. Electrodes 13 and 14 are of a suitable metal such as aluminum for example. Margins 15 and 16 are provided for preventing electrical short circuit between the electrodes. As shown in FIG. 2, suitable terminal leads 23 and 24 are attached to the electrodes 13 and 14 from opposite ends 21 and 22 of the capacitor body 10. Suitable lead material could be solder coated copper for example.

The dielectric plastic films or layers 11 and 12 should have high dielectric strength, low dissipation factor to prevent thermal runaway, broad temperature range capabilities, resistance to the dielectric fluid, and freedom from pinholes and conductive particles. Suitable dielectric film layers 11 and 12 may be paper, a paper and polymeric film combination, or polymeric films.

Figure 3:
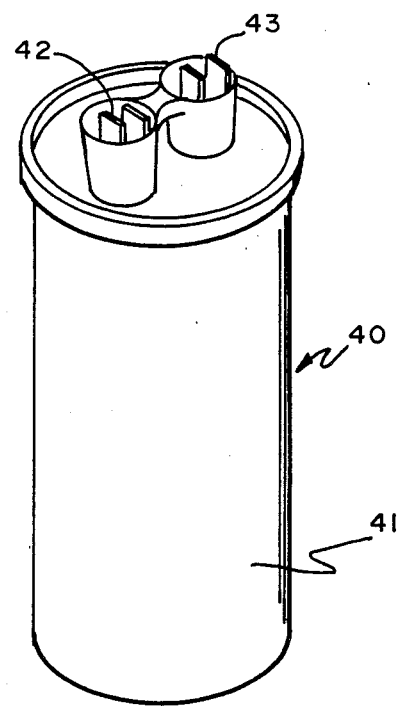
FIG. 3 of the drawing illustrates the a-c capacitor body suitably encased and sealed in a housing.

In FIGS. 2 and 3, a capacitor body 10 is preferably sealed to a can or housing 40 to form a capacitor 41. Capacitor 41 includes the metal housing or can 40 and terminals 42 and 43. The capacitor body 10 is contained within the housing 40 and terminal lead 23 makes electrical contact with terminal 42 and the remaining terminal lead 24 makes electrical contact with terminal 43.

As noted previously, fluid or liquid dielectric impregnants for electrical capacitors should have a high dielectric constant, maintain a low dissipation factor, be compatible with the other materials used in capacitor structure and should add stability to the capacitor to increase its life. According to the present invention, the dielectric fluid which is used to impregnate the capacitor body 10 satisfies all of these requirements. The dielectric fluid of the present invention includes DOP with an additive of epoxidized linseed oil. Expoxidized linseed oil goes by the generic name Epoxol 9-5 and is obtainable in large quantities from American Chemical Science, Inc. The amount added is between 0.1 to 30% by weight of the DOP. A minor amount of a suitable antioxidant such as 2,6-di-tert-butyl-para-cresol is also added. The antioxidant is generically known as CAO-1 and is produced by Sherwin-Williams Chemical Co.

When used as an additive in a dielectric fluid for capacitors of the type described in FIGS. 1-3, the additive is mixed as a liquid with liquid DOP, refined through a chromatographic column using Fuller's Earth or aluminum oxide and then impregnated into the capacitors. Several capacitors impregnated with DOP and 4.7% by weight of Epoxol 9-5 as well as 0.05% by weight of CAO-1 were life tested for 1,000 hours. None failed.

What is claimed is:

1. In a capacitor, a dielectric fluid consisting of dioctyl phthalate and an addition of epoxidized linseed oil in an amount of from 0.1 to 30% by weight of the dioctyl phthalate and a second additive of up to 0.05% by weight of an antioxidant.

2. In a capacitor according to claim 1 wherein said antioxidant is 2,6-di-tert-butyl-para-cresol.

* * * * *